(12) United States Patent
Torimaru

(10) Patent No.: US 9,104,620 B2
(45) Date of Patent: Aug. 11, 2015

(54) BACKUP METHOD AND INFORMATION PROCESSING APPARATUS

(71) Applicant: FUJITSU LIMITED, Kawasaki-shi (JP)

(72) Inventor: Sumiko Torimaru, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 13/855,412

(22) Filed: Apr. 2, 2013

(65) Prior Publication Data

US 2013/0304701 A1 Nov. 14, 2013

(30) Foreign Application Priority Data

May 10, 2012 (JP) ................................. 2012-108191

(51) Int. Cl.
*G06F 17/30* (2006.01)
*G06F 11/14* (2006.01)

(52) U.S. Cl.
CPC ........ *G06F 11/1448* (2013.01); *G06F 11/1453* (2013.01)

(58) Field of Classification Search
CPC . G06F 11/1453; G06F 3/0641; G06F 3/0608; G06F 17/3015; G06F 17/30575; G06F 11/1448
USPC .......................................... 707/641; 711/216
See application file for complete search history.

(56) References Cited

U.S. PATENT DOCUMENTS

| 4,959,774 | A | 9/1990 | Davis | |
|---|---|---|---|---|
| 7,051,173 | B2 | 5/2006 | Tsuchiya et al. | |
| 8,234,468 | B1 * | 7/2012 | Deshmukh et al. | 711/162 |
| 8,352,692 | B1 * | 1/2013 | Jordan | 711/162 |
| 2006/0064444 | A1 * | 3/2006 | van Ingen et al. | 707/204 |
| 2007/0286099 | A1 * | 12/2007 | Stocklein et al. | 370/259 |
| 2010/0070475 | A1 * | 3/2010 | Chen | 707/640 |
| 2011/0225211 | A1 * | 9/2011 | Mukherjee et al. | 707/812 |

FOREIGN PATENT DOCUMENTS

| JP | 61-026155 | 2/1986 |
|---|---|---|
| JP | 11-120057 | 4/1999 |
| JP | 2001-290686 | 10/2001 |

OTHER PUBLICATIONS

CNOA—Office action of Chinese patent application 201310169122.9 dated Sep. 17, 2014, with full English-language translation of the Office action.

* cited by examiner

*Primary Examiner* — Apu Mofiz
*Assistant Examiner* — Jared Bibbee
(74) *Attorney, Agent, or Firm* — Fujitsu Patent Center

(57) ABSTRACT

The disclosure includes a backup method executed by a computer, and the backup method includes: determining whether or not a previous backup processing was automatically executed; and upon determining that the previous backup processing was automatically executed, merging a previous backup data generated by the previous backup processing into a current backup data.

6 Claims, 13 Drawing Sheets

| BACKUP DATE | 2012/01/03 08:00:00 |
| --- | --- |
| ACTIVATION TYPE | MANUAL |
| BACKUP TARGETS | C:\X |
| COMMENTS | STORE PICTURES OF SPORTS MEETING |
| NO. OF BACKUP FILES | 2 |

| PATH | C:\X\A |
| --- | --- |
| UPDATE DATE | 2012/01/01 09:00:00 |

| PATH | C:\X\B |
| --- | --- |
| UPDATE DATE | 2012/01/02 10:00:00 |

BACKUP FILE  A  B

FIG.5

| | |
|---|---|
| BACKUP DATE | 2012/01/06 12:00:00 |
| ACTIVATION TYPE | AUTOMATIC |
| BACKUP TARGETS | C:\X |
| COMMENTS | AUTOMATIC BACKUP |
| NO. OF BACKUP FILES | 2 |

| | |
|---|---|
| PATH | C:\X\B |
| UPDATE DATE | 2012/01/04 11:00:00 |

| | |
|---|---|
| PATH | C:\X\C |
| UPDATE DATE | 2012/01/05 13:00:00 |

BACKUP FILE  B  C

FIG.7

| | |
|---|---|
| BACKUP DATE | 2012/01/08 12:00:00 |
| ACTIVATION TYPE | AUTOMATIC |
| BACKUP TARGETS | C:\X |
| COMMENTS | AUTOMATIC BACKUP |
| NO. OF BACKUP FILES | 1 |

| | |
|---|---|
| PATH | C:\X\B |
| UPDATE DATE | 2012/01/07 14:00:00 |

BACKUP FILE  B

FIG.9

BACKUP METHOD AND INFORMATION PROCESSING APPARATUS

CROSS-REFERENCE TO RELATED APPLICATIONS

This application is based upon and claims the benefit of priority of the prior Japanese Patent Application No. 2012-108191, filed on May 10, 2012, the entire contents of which are incorporated herein by reference.

FIELD

This technique relates to a data backup technique.

BACKGROUND

In order to prepare for data loss due to disk damage, operation error or virus, the data backup is carried out. By generating copy data by the backup, it is possible to restore data.

In addition, in order to restore data even when the manual backup operation is forgotten, automatic backup is also carried out. Especially, in order to protect the latest state of the data that is frequently updated, the amount of stored data steadily increases.

In order to reduce the amount of data stored by the backup, a differential backup processing to store only added data or changed data is performed. However, even when the differential backup processing is carried out, there is no difference in that the amount of stored data increases every time the differential backup processing is carried out.

Namely, there is no technique to suppress the increase of the amount of backup data stored by the automatic backup.

SUMMARY

A backup method includes: determining whether a previous backup processing was automatically executed; and upon determining that the previous backup processing was automatically executed, merging a previous backup data into a current backup data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram depicting an example of backup data;

FIG. 7 is a diagram depicting an example of backup data;

FIG. 9 is a diagram depicting an example of backup data;

DESCRIPTION OF EMBODIMENTS

Figure 1:
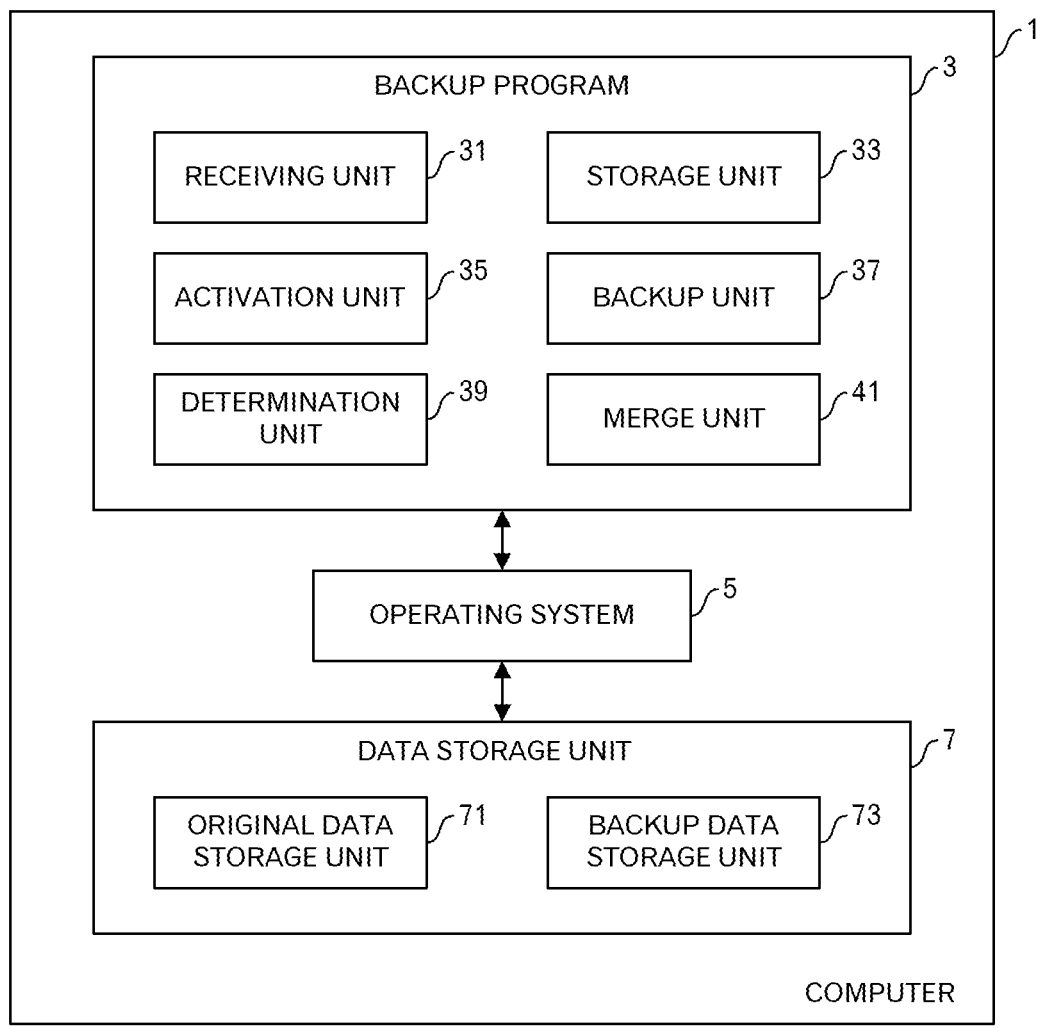
FIG. 1 is a diagram depicting an example of a module configuration relating to backup in an embodiment.

FIG. 1 is a diagram depicting an example of a module configuration relating to the backup. A computer 1 that is a backup apparatus has a backup program 3, an operating system 5 and a data storage unit 7. The backup program 3 in FIG. 1 represents a program stored, for example, in a Hard Disk Drive (HDD) is loaded onto a Random Access Memory (RAM), and is in a state that the program is executed by a Central Processing Unit (CPU).

The backup program 3 has a receiving unit 31, a storage unit 33, an activation unit 35, a backup unit 37, a determination unit 39 and a merge unit 41. The receiving unit 31 operates so as to accept instructions or the like for the automatic backup from a user.

The storage unit 33 stores targets of the automatic backup, which are designated by the user. The activation unit 35 operates so as to determine a timing for the automatic backup. The backup unit 37 performs a manual backup processing and an automatic backup processing. The manual backup processing is a backup processing activated in response to a user's instruction. The automatic backup processing is a backup processing activated based on automatic determination of conditions by the computer 1, regardless of the user's instruction. In this embodiment, the differential backup processing to store only the difference data with the previous backup data is carried out not only in the manual backup processing but also in the automatic backup processing.

The determination unit 39 operates so as to determine whether or not the merge should be carried out. The merge unit 41 operates so as to merge the previous backup data and the present backup data. In the merge processing, information that overlaps with the present backup data and old data are discarded among the previous backup data. As a result of the merge processing, only the latest information remains at the present backup timing.

The operating system 5 operates so as to provide a file list included in a directory to the backup program 3, for example. The operating system 5 also carries out file management such as reading or writing a file. The directory may be called "folder".

The data storage unit 7 is provided in a storage medium such as an HDD or Universal Serial Bus (USB) memory. The data storage unit 7 has an original data storage unit 71 and backup data storage unit 73.

The original data storage unit 71 is designated as a backup target. The backup target is designated with a unit to identify a range of original data to be backed up. For example, when a drive is designated as a backup target, the entire drive is the original data storage unit 71, and files under the root directory of the designated drive are the original data to be protected by the backup. When a specific directory within a drive is designated as a backup target, the specific directory within the drive is the original data storage unit 71, and files under that specific directory are original data to be protected by the backup.

The backup data storage unit 73 is a storage area storing the backup data.

Although FIG. 1 depicts that the original data storage unit 71 and the backup data storage unit 73 are included in the same data storage unit 7, the original data storage unit 71 and the backup data storage unit 73 may be included in separate data storage units. Moreover, the original data storage unit 71 and the backup data storage unit 73 may be included in the separate storage media. For example, the original data storage unit 71 may be provided in the HDD, and the backup data storage unit 73 may be provided in a removable and rewritable disk such as the USB memory, CD-R (Compact disc recordable) or CD-RW (CD rewritable) or DVD-R (Digital Versatile Disc recordable) or DVD-RW (DVD rewritable).

Figure 2:
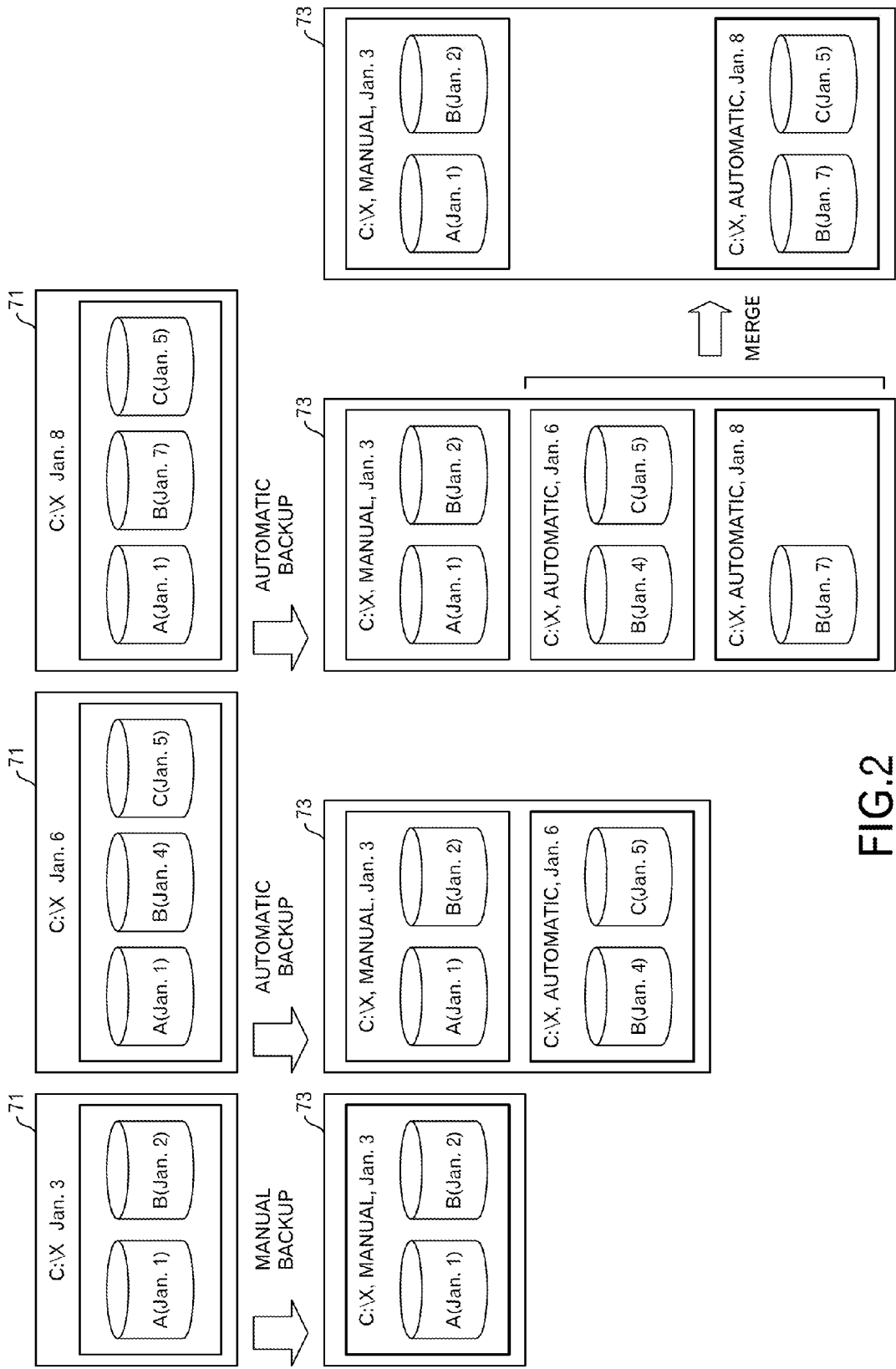
FIG. 2 is a diagram depicting an example of a backup processing.

Firstly, an outline of the backup in this embodiment will be explained by using an example. FIG. 2 illustrates an example of the backup. In this example, a manual backup was carried out on January 3, an automatic backup was carried out on January 6, and an automatic backup and a merge were carried out on January 8. In this embodiment, when both of the present backup on January 8 and the previous backup on January 6 were "automatic backup", the merge is carried out for the automatic backup on January 8. Like the backup on January 6, when the previous backup on January 3 was "manual backup", the merge is not carried out.

The manual backup on January 3 is the first backup. The backup target in the manual backup on January 3 is "C:¥X", namely, a directory "X" in the C drive. The directory "X" of the C drive corresponds to the original data storage unit 71. When the manual backup on the January 3 is carried out, files "A" and "B" are stored in the directory "X" in the C drive as the backup target. The update date of the file "A" is January 1, and the update date of the file "B" is January 2.

The backup data generated by the manual backup are surrounded in the lower column by a thick line. The backup data is generated in the backup data storage unit 73. The backup data includes the backup target "C:¥X", activation type "manual" and backup date "January 3". The backup data further includes backup files "A" and "B". All files are backed up at the first backup.

The automatic backup on January 6 is the second backup.

The backup target is "C:¥X", which is the same as that of the manual backup on January 3. When the automatic backup on January 6 is carried out, the files "A", "B" and "C" are stored in the directory "X" in the C drive, which is the backup target. The update date of the file "A" is January 1, and the file "A" does not change from the timing of the manual backup on January 3. On the other hand, the update date of the file "B" is January 4, and the file "B" is changed from the timing of the manual backup on January 3. The backup date of the file "C" is January 5, and the file "C" is an added file after the manual backup on January 3.

In the automatic backup on January 6, only the difference with the backup data on January 3, which was made by the manual backup, is stored as new backup data. The backup data generated by the automatic backup is surrounded in the lower column by the thick line. The backup data is generated in the backup data storage unit 73 similarly to the previous backup. The backup data includes the backup target "C:¥X", the activation type "automatic", and the backup date "January 6". The backup data further includes the backup file "B" and the backup file "C". Because the file "A" is the same as data at the previous backup, no backup data is added. Because the file "B" is changed, the file "B" is added to the backup data again. Because the file "C" is newly added, the file "C" is added to the backup data.

Because the activation type of the previous backup that was carried out on January 3 is "manual", the merge is not carried out in the automatic backup on January 6. The backup data generated by the "manual backup" is data stored by the user intentionally, and it is preferable that the data at that time is left in a restorable state. If the backup data on January 3 and the backup data on January 6 would be merged, the file "A" that is not included in the backup data on January 6 would be transferred and left in the backup data on January 6. However, the old file "B" whose update date is January 2 would be erased without transferred to the backup data on January 6. In such a case, a portion of the previous backup data may be erased when the merge would be carried out. Therefore, when the activation type of the previous backup is "manual", the merge is not carried out. Therefore, the backup data generated by the manual backup is held as it is.

The automatic backup on January 8 is the third backup. The backup target is the directory "C:¥X" that is the same as that of the previous backup and backup before last. At the time of the automatic backup on January 8, the files "A", "B" and "C" are stored in the directory "X" in the C drive as the backup target. The update date of the file "A" is January 1, and the file "A" does not change from the timing of the manual backup on January 3. On the other hand, the update date of the file "B" is January 7, and the file "B" is further changed from the timing of the automatic backup on January 6. The update date of the file "C" is January 5, and the file "C" does not change from the timing of the automatic backup on January 6.

In the automatic backup on January 8, only difference with the previous backup data on January 6 is stored as the backup data. The backup data generated by this automatic backup is surrounded in the lower column by the thick line. The backup data is generated in the backup data storage unit 73 similarly to the previous backup and backup before last. The backup data includes the backup target "C:¥X", activation type "automatic" and backup date "January 8". The backup data further includes the backup file "B". Because the file "A" does not change, no data is added to the backup data. Because the file "B" is changed, the backup file "B" is added to the backup data. Because the file "C" does not change, no data is added to the backup data.

Because the activation type of the previous backup carried out on January 6 is "automatic", the merge is carried out together in the automatic backup on January 8. The backup data generated by the "automatic" backup is not data stored by the user intentionally. Therefore, it is assumed that there is no problem even if the data generated at that timing cannot be restored. As for the file "B", the latest file whose update date is January 7 is left, and old file whose update date is January 4 is not left. The file "C" is not included in the present backup data. Therefore, the file "C" included in the previous backup data is transferred to the present backup data. Then, the previous backup data is entirely erased. The old file "B" whose update date is January 4 is erased, however, it is presumed that the user does not mention the backup on January 6, and it is sufficient that the latest file "B" whose update date is January 7 can be restored.

Figure 3:
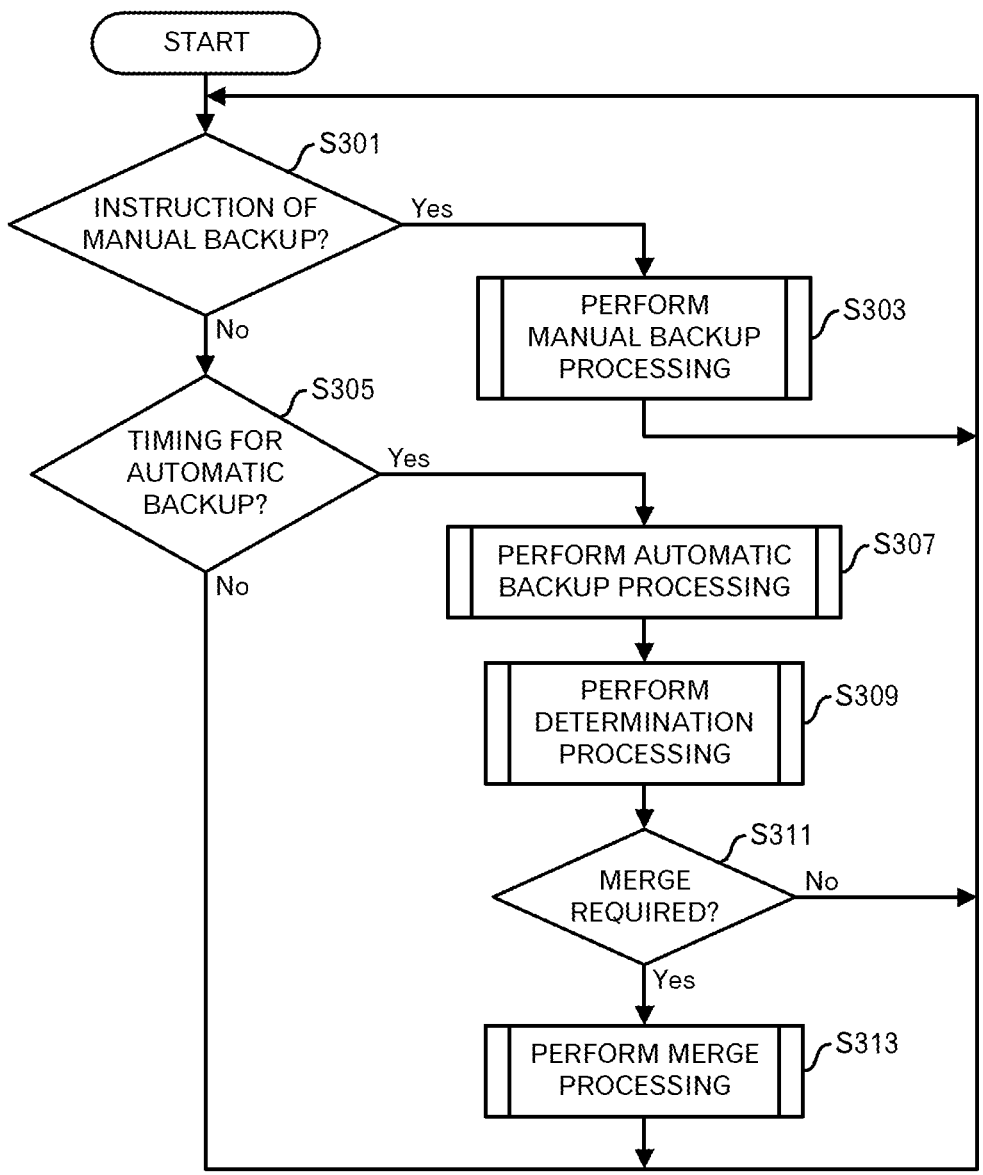
FIG. 3 is a diagram depicting an example of a processing flow executed by a backup program.

Next, a processing executed by the backup program in this embodiment will be explained. FIG. 3 illustrates an example of a processing flow for the backup program. The receiving unit 31 accepts an instruction from the user, and determines whether or not the accepted instruction is an instruction of the manual backup (S301). When it is determined that the accepted instruction is the instruction of the manual backup, the backup unit 37 performs a manual backup processing (S303). The manual backup processing is a backup processing activated in response to the instruction from the user. Therefore, the data stored by the manual backup processing is information that the user intentionally designated to be left. The manual backup processing will be explained later by using FIG. 4.

When it is determined that the accepted instruction is not the instruction of the manual backup, the activation unit 35 determines whether or not it is a timing for the automatic backup (S305). When it is determined that it is the timing for the automatic backup, the backup unit 37 performs the automatic backup processing (S307). The automatic backup processing is a backup processing activated originally by the computer. Therefore, the data stored by the automatic backup processing is not information that the user intentionally designated to be left. This data is automatically stored in order to restore original data even when the operation of the manual backup is forgotten. The automatic backup processing will be explained later by using FIG. 6.

On the other hand, when it is not the timing for the automatic backup, the processing returns to the processing to accept the instruction of the manual backup at S301.

Next, the determination unit 39 performs a determination processing (S309). In the determination processing, it is determined mainly based on the activation type of the previous backup whether or not the merge should be executed. The determination processing will be explained later by using FIG. 8.

The determination unit 39 determines whether the determination result is "merge required" or "merge not required" (S311).

When the determination result represents "merge required", the merge unit 41 performs a merge processing (S313). The merge processing will be explained later by using FIG. 10. When the merge processing ends, the processing returns to the processing to accept the instruction of the manual backup at S301.

On the other hand, when the determination result represents "merge not required", the merge processing is not executed, in other words, the merge processing is omitted, and the processing returns to the processing to accept the instruction of the manual backup at S301.

Figure 4:
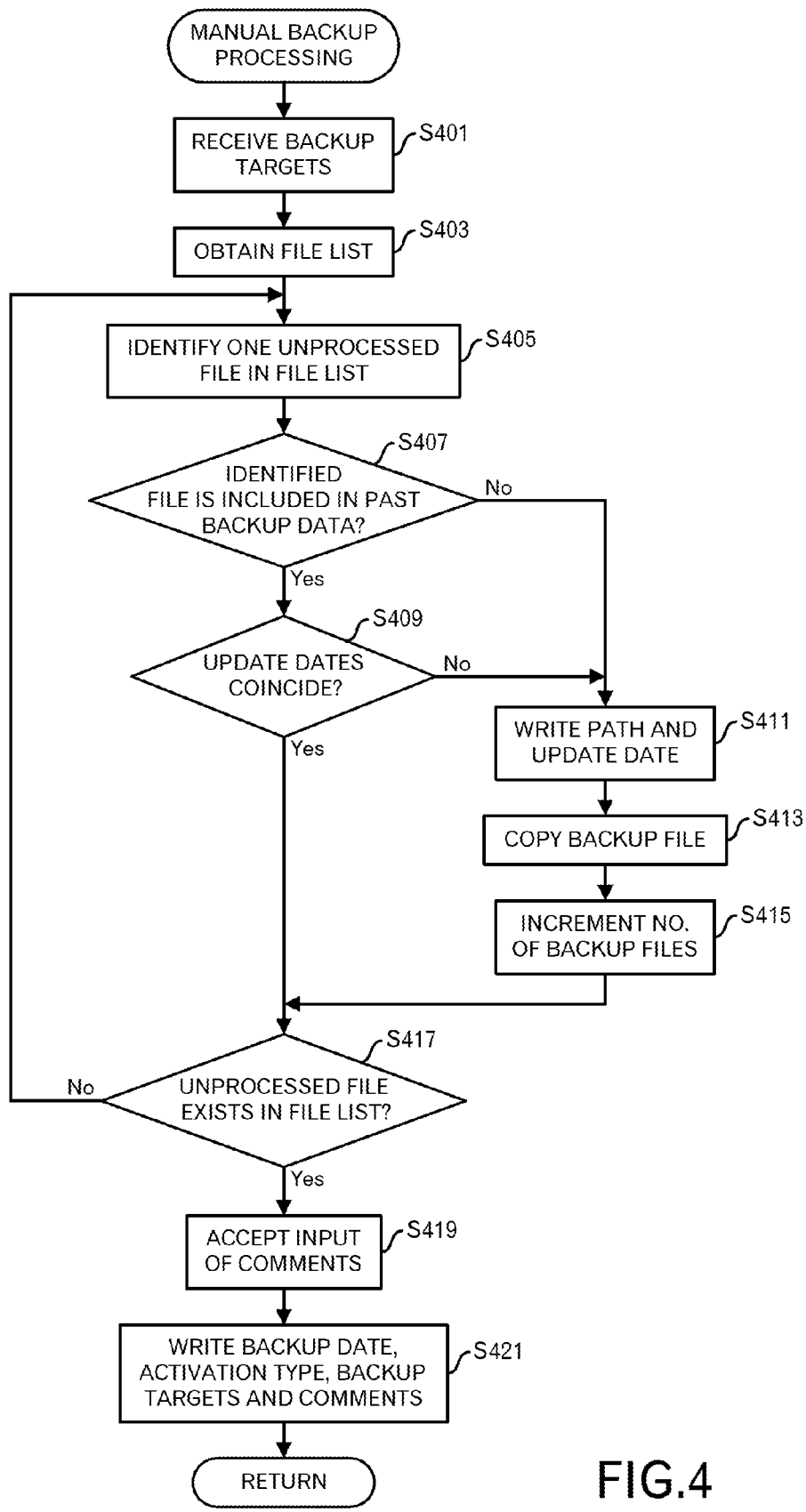
FIG. 4 is a diagram depicting an example of a processing flow of a manual backup processing.

Next, the manual backup processing depicted in S303 of FIG. 3 will be explained. FIG. 4 illustrates an example of a processing flow for the manual backup processing. The backup unit 37 accepts an instruction of a backup target through the receiving unit 31 (S401). For example, identification information of a storage area such as a drive name or directory name is accepted. Files included in this storage area are targets of the protection by the backup.

The backup unit 37 obtains a list of files as the backup targets (S403). Specifically, the backup unit 37 designates the drive name and/or directory name as the backup targets to request the operating system 5 to return the file list. The operating system 5 returns the list of files included in the drive and/or directory, which are designated as the drive name and/or directory name, to the backup unit 37.

The backup unit 37 repeats a processing from S407 to S415 for each file included in the file list (S405). The backup unit 37 determines whether or not that file is included in the past backup data (S407). When that file is not included in the past backup data, the processing shifts to a processing from S411 to S415. That file is added to the backup data by the processing.

When that file is included in the past backup data, the backup unit 37 further determines whether or not the update date of that file is identical to the update date in the past backup data (S409). When it is determined that the update date of that file is not identical to the update date in the past backup data, the processing shifts to a processing from S411 to S415. That file is added to the backup data by the processing.

On the other hand, when it is determined that the update date of that file is identical to the update date in the past backup data, generation of the backup data is not performed and the processing shifts to a processing of S417.

Here, the structure of the backup data will be explained. The backup data is generated every time the backup processing is executed, and is added to the backup data storage unit 73. FIG. 5 illustrates an example of the backup data. The backup data includes the backup date, an activation type, backup targets, comments and the number of backup files. The backup data further includes a body of the original backup file. In addition, FIG. 5 illustrates contents of the backup data on January 3 in the example illustrated in FIG. 2.

The backup date is a date when the backup data was generated. The activation type is a type of the activation of the backup processing by which the backup data was generated. The activation type in this embodiment is either "manual" in which the backup is carried out in response to the instruction of the user or "automatic", in which the backup is carried out based on the automatic determination of the computer. The backup target represents a unit to identify a range of data to be backed up. The backup target in this embodiment is a drive or directory or files. The comments are ancillary information for user against this backup. For example, the comments maybe used as a title or a note. The number of backup files is the number of files stored by this backup. Furthermore, for each backup file, a path in which the original file of that backup was stored, an update date of that backup file and the body of that backup file are stored. The update date of the backup file is the date when that backup file was generated.

Returning to the explanation of FIG. 4, a processing to generate the backup data from S411 to S415 will be explained. The backup unit 37 writes the path and update date into an area of the backup data (S411), and copies the original file into the area of the backup data (S413). Furthermore, the backup unit 37 increments the number of backup files (S415).

The backup unit 37 determines whether or not all of the files in the file list have been processed (S417). When there is an unprocessed file among files in the file list, the processing returns to S405.

On the other hand, when it is determined that all of the files included in the file list, the backup unit 37 accepts inputs of the comments from the user through the receiving unit 31 (S419). Furthermore, the backup unit 37 obtains the present date and time from a clock in the computer, and writes the present date and time as the backup date and writes "manual" as the activation type. The backup unit 37 further writes the backup targets obtained at S401, and writes the comments accepted at S419 (S421). Then, the backup unit 37 ends the processing of the manual backup, and the processing returns to S301 in FIG. 3.

Figure 6:
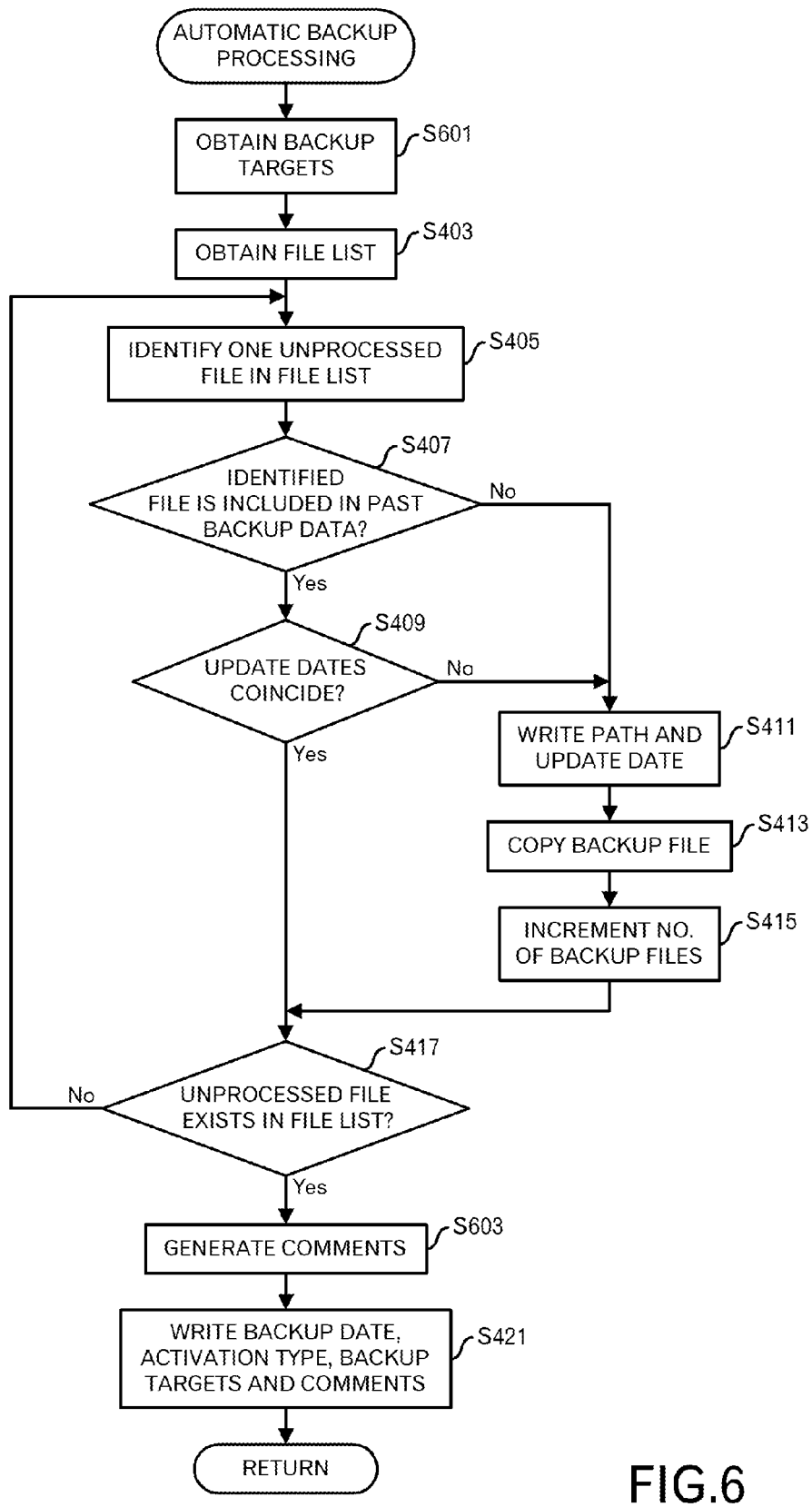
FIG. 6 is a diagram depicting an example of a processing flow of an automatic backup processing.

Next, the automatic backup processing depicted at S307 in FIG. 3 will be explained. FIG. 6 illustrates an example of a processing flow of the automatic backup processing. Hereinafter, difference points with the manual backup processing of FIG. 4 will be explained.

The backup unit 37 reads the backup targets from the storage unit 33 (S601), instead of accepting inputs of the backup targets in the manual backup processing (S401). Inputs of the backup targets in the automatic backup are accepted from the user in advance through the receiving unit 31, and the backup targets are stored in the storage unit 33. The automatic backup processing is executed for the files identified as the backup targets for the automatic backup.

The processing from S403 to S417 is similar to the processing in case of the manual backup processing illustrated in FIG. 4. Then, instead of accepting inputs of the comments in the manual backup processing (S419), the backup unit 37 generates comments, automatically (S603). For example, the backup unit 37 uses a character string "automatic backup" as the comments. The backup unit 37 may use, as the title, the date of the backup, drive name or directory name of the backup targets. The backup unit 37 writes "automatic" as the activation type at S421. After the end of the 5421, the processing returns to S309 in FIG. 3.

FIG. 7 illustrates an example of the backup data generated by the automatic backup. Items included in the backup data are common to the backup data generated by the manual backup. However, the activation type becomes "automatic", and the comments become the character string generated automatically. FIG. 7 illustrates contents of the backup data generated on January 6 in the example illustrated in FIG. 2.

Figure 8:
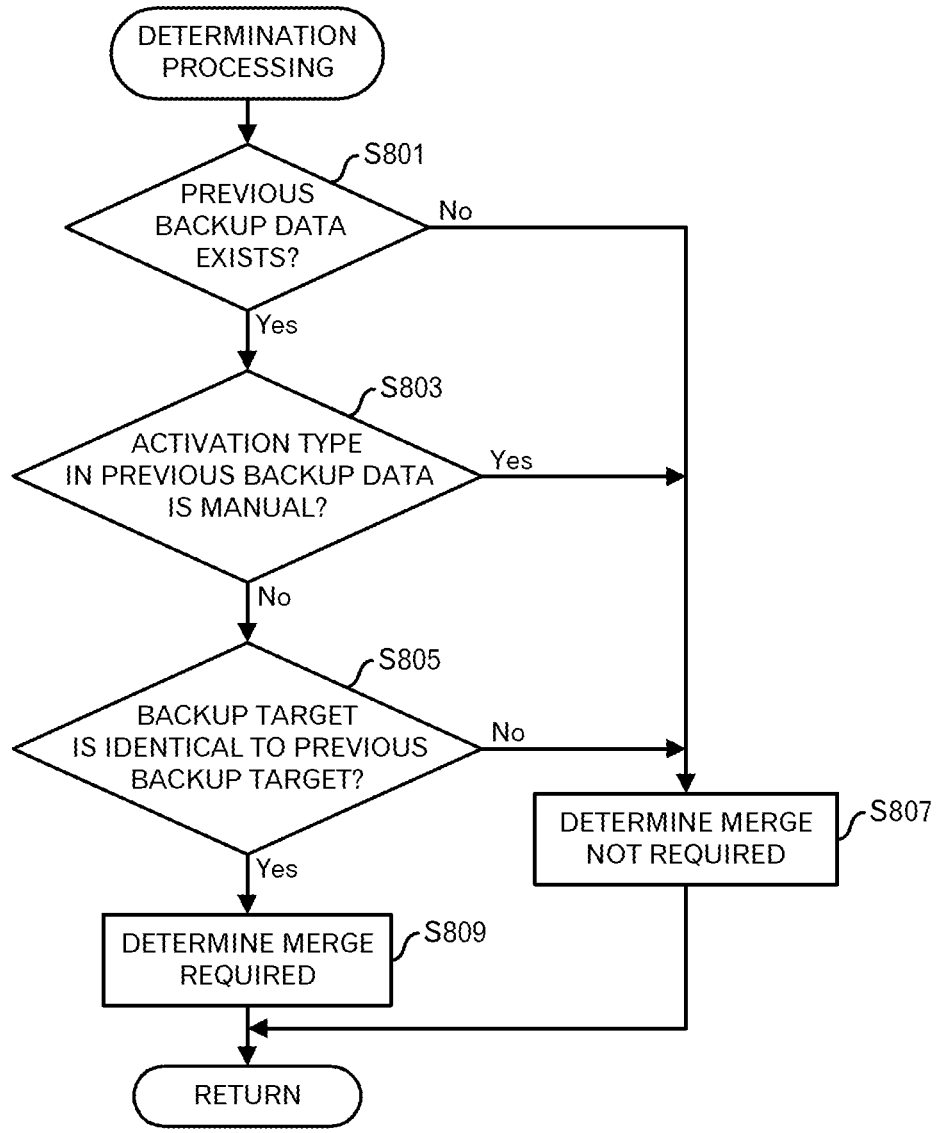
FIG. 8 is a diagram depicting an example of a processing flow of a determination processing.

Next, a determination processing at S309 in FIG. 3 will be explained. FIG. 8 illustrates an example of a processing flow of the determination processing. In this processing, the determination unit 39 determines whether or not the merge is carried out. When it is determined that the merge is performed, the determination unit 39 sets "merge required" as the determination result. On the other hand, when the merge is not performed, the determination unit 39 sets "merge not required" as the determination result. First, the determination unit 39 determines whether or not the previous backup data exists (S801). Specifically, when the backup data has already been stored in the backup data storage unit 73, it is determined that the previous backup data exists, and when the backup data has not been stored in the backup data storage unit 73, it is determined that there is no previous backup data. When plural backup data blocks have already been stored in the backup data storage unit 73, it is determined that there is the previous backup data, and it is determined that the backup data whose update date is the latest among the plural backup data blocks is the previous backup data.

When it is determined that there is no previous backup data, the determination unit 39 sets "merge not required" as the determination result (S807). This is because there is not target for the merge.

On the other hand, when it is determined that there is the previous backup data, the determination unit 39 obtains the activation type from the previous backup data identified at S801, and determines whether the activation type of the previous backup data is "manual" or "automatic" (S803). When it is determined that the activation type of the previous backup data is "manual", the determination unit 39 sets "merge not required" as the determination result (S807). This is because the backup data that is left intentionally by the user is held as it is.

On the other hand, when it is determined that the activation type in the previous backup data is "automatic", the determination unit 39 determines whether or not the present backup target is identical to the previous backup target (S805). When it is determined that the present backup target is not identical to the previous backup target, the determination unit 39 sets "merge not required" as the determination result (S807). This is because it is not possible to merge them each other. On the other hand, when it is determined that the present backup target is identical to the previous backup target, the determination unit 39 sets "merge required" as the determination result. (S809). When the processing ends, the processing returns to S311 in FIG. 3.

FIG. 9 illustrates an example of the backup data before the merge. FIG. 9 represents contents of the backup data before the merge on January 8 in the example depicted in FIG. 2.

Figure 10:
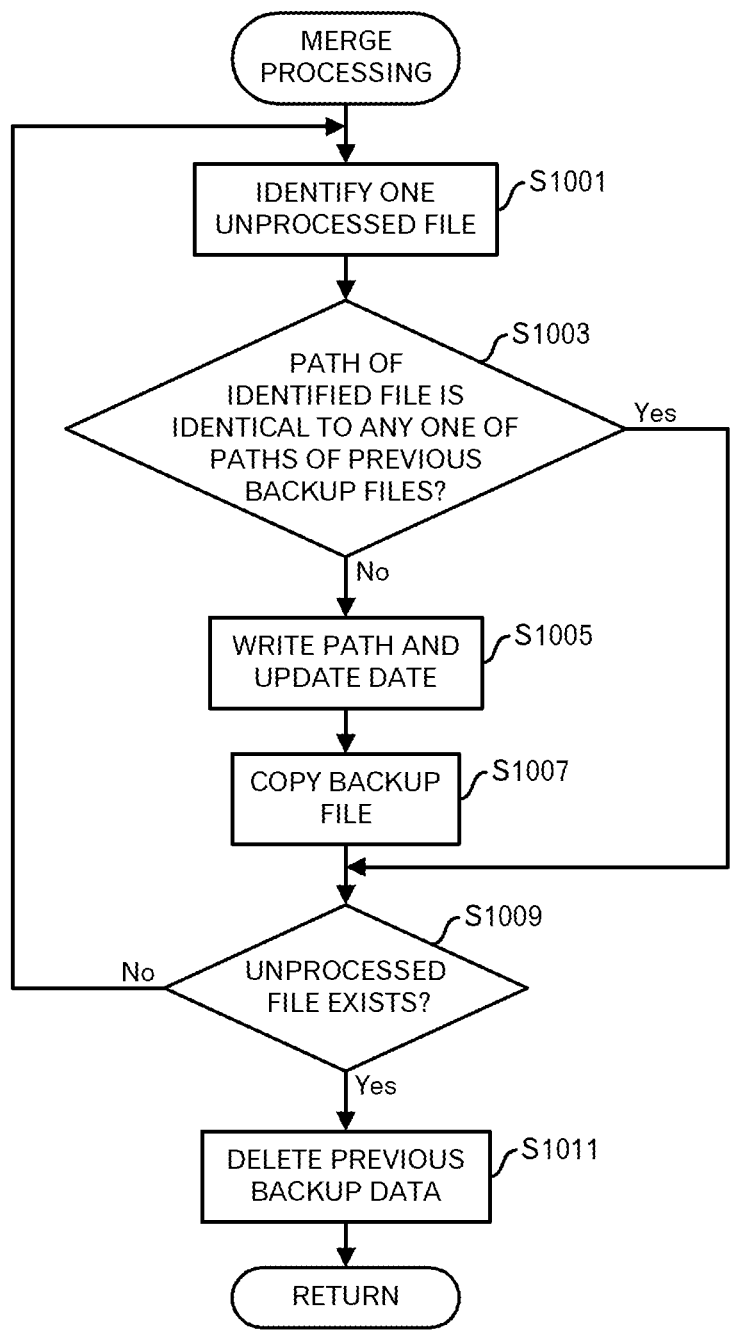
FIG. 10 is a diagram depicting an example of a processing flow of a merge processing.

Next, the merge processing at S313 in FIG. 3 will be explained. FIG. 10 illustrates an example of a processing flow of the merge processing. In the merge processing, necessary backup files of the backup files in the previous backup data are transferred to the present backup data, and after that, the previous backup data is deleted.

The merge unit 41 repeats a processing from S1003 to S1007 for each backup file included in the previous backup data (S1001). The merge unit 41 determines whether or not the path in the previous backup file is identical to any one of the paths of the backup files in the present backup files (S1003). When the path of the previous backup file is not identical to any one of the paths of the present backup files, the merge unit 41 operates so as to transfer the previous backup file to the present backup data in order to leave the previous backup file. Specifically, the merge unit 41 writes the path and update date of that previous backup file as the path and update date of the present backup file (S1005), and further copies the previous backup file included in the previous backup data as the backup file in the present backup data (S1007).

On the other hand, when the path of the previous backup file is identical to any one of the paths of the present backup files, there is no need to leave that previous backup file. Therefore, the processing of S1005 and S1007 is not executed.

The merge unit 41 determines whether or not all backup files included in the previous backup data have been processed (S1009). When it is determined that there is an unprocessed backup file, the processing returns to S1001. When it is determined that there is no unprocessed backup file, the merge unit 41 deletes the previous backup data (S1011), and the merge processing ends, and then the processing returns to S301 in FIG. 3.

Figure 11:
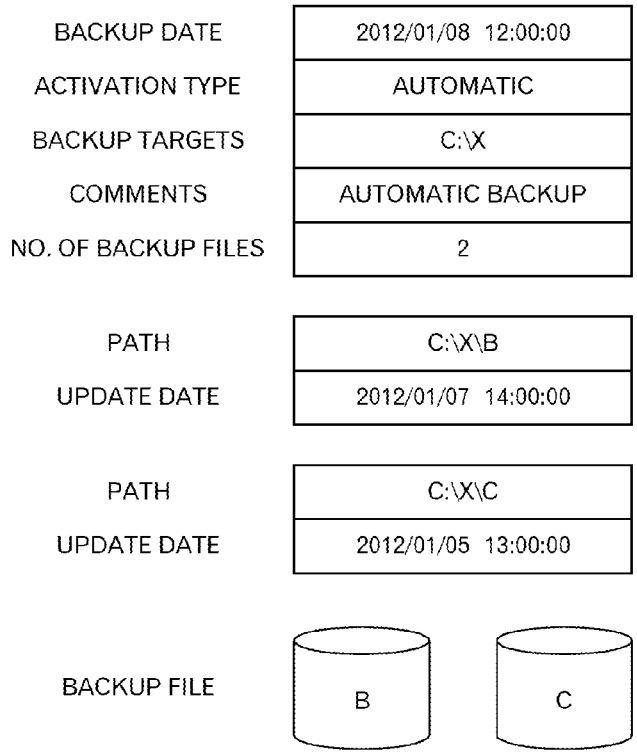
FIG. 11 is a diagram depicting an example of backup data.

FIG. 11 illustrates the backup data after the merge. FIG. 11 represents contents of the backup data after the merge on January 8 in the example illustrated in FIG. 2.

Figure 12:
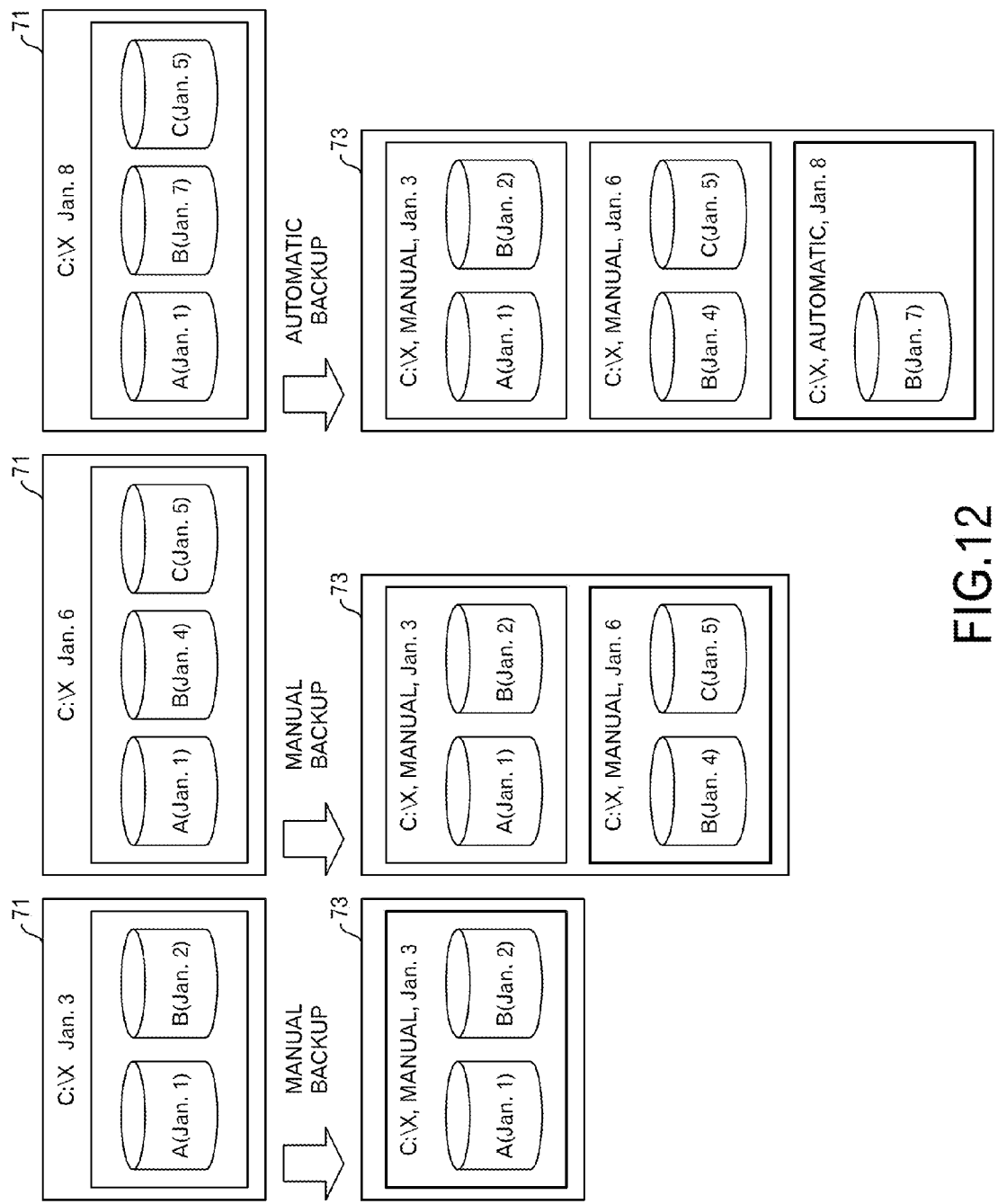
FIG. 12 is a diagram depicting an example of the backup processing.

Next, another example of the backup will be explained. FIG. 12 illustrates an example that the merge is not executed because the activation type of the previous backup is "manual".

The first backup is similar to the first backup in FIG. 2. The second backup is activated manually. Therefore, the activation type of the second backup data represents "manual". The second backup is similar to the second backup in FIG. 2 except for the activation type being "manual".

The third backup is similar to the third backup in FIG. 2. However, in the determination processing (FIG. 8) after the third automatic backup, "merge not required" is determined at S807, because the activation type of the previous backup data represents "manual". Therefore, the merge processing is not carried out. Thus, the second backup data generated by the manual backup is held as it is.

Figure 13:
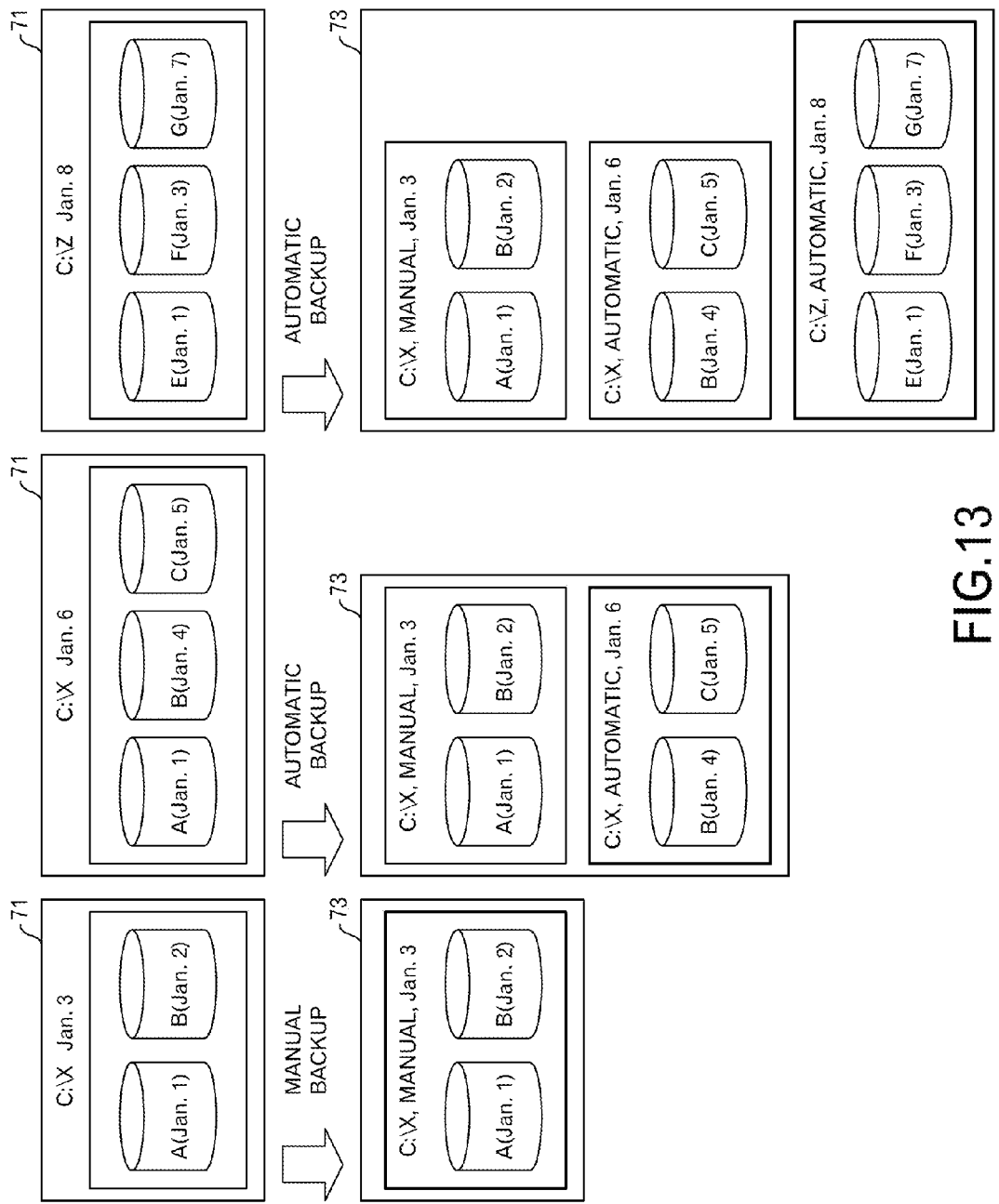
FIG. 13 is a diagram depicting an example of the backup processing.

FIG. 13 illustrates a case where no merge is executed because the backup target is changed. The first backup and second backup are similar to the first backup and second backup in FIG. 2. The backup target of the third backup is "C:¥Z". Therefore, in the determination processing (FIG. 8) after the third automatic backup, it is determined at S805 that the present backup target is not identical to the previous backup target. Therefore, the determination result becomes "merge not required". As a result, the merge processing is not performed.

Figure 14:
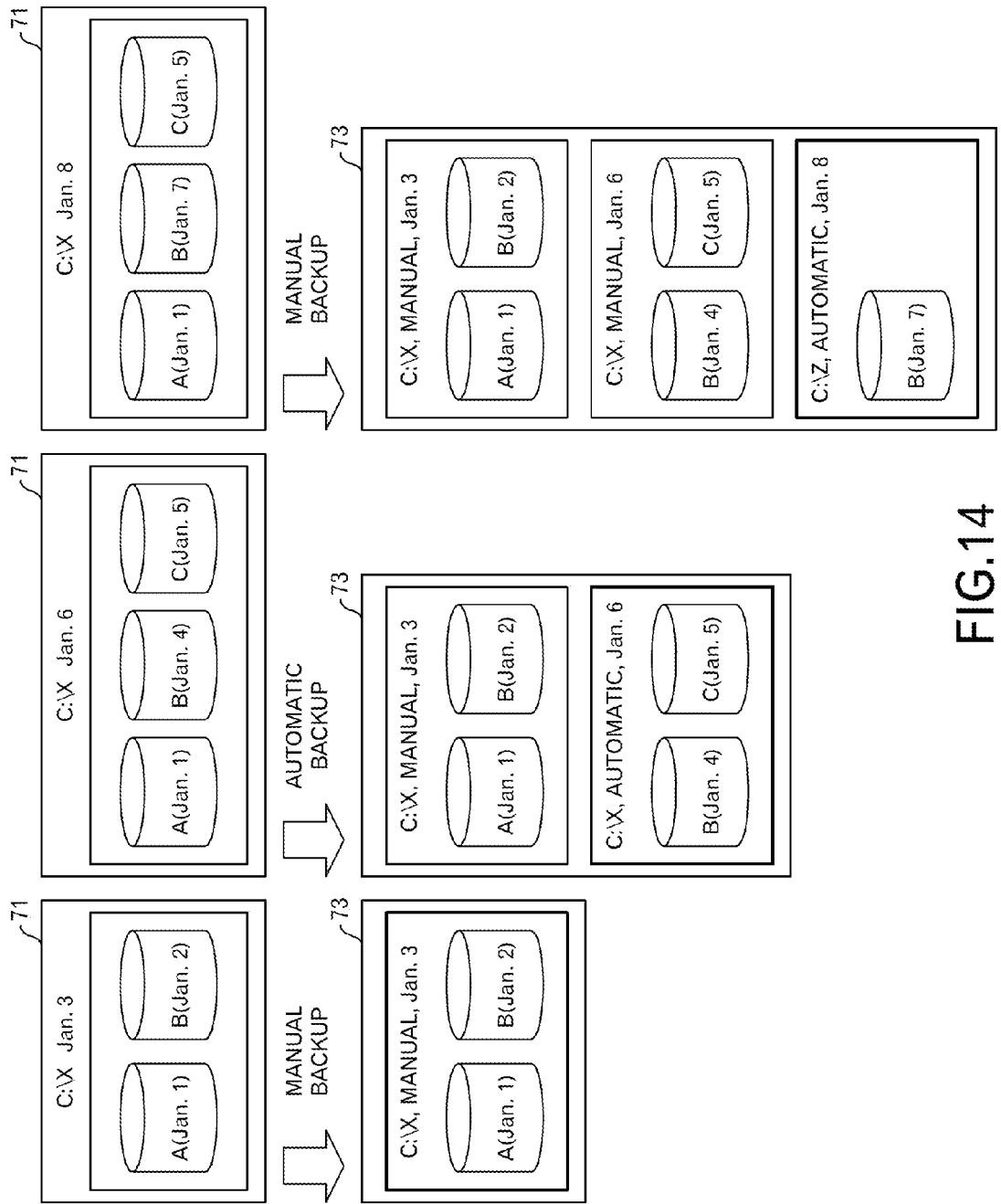
FIG. 14 is a diagram depicting an example of the backup processing.

FIG. 14 illustrates an example that no merge is executed because of the manual backup. The first backup and second backup are similar to the first backup and second backup in FIG. 2. The activation type of the third backup is "manual". As illustrated in FIG. 3, after the manual backup processing (S303), the determination processing (S309) and merge processing (S313) are not performed. Therefore, no merge is performed.

Although one embodiment of this technique was explained, this technique is not limited to this embodiment. For example, the functional block diagram does not always correspond to a program module configuration.

Moreover, the aforementioned configuration of the storage areas is a mere example, and may be changed. Furthermore, as for the processing flows, as long as the processing result does not change, the turns of the steps may be exchanged, and steps may be executed in parallel.

Figure 15:
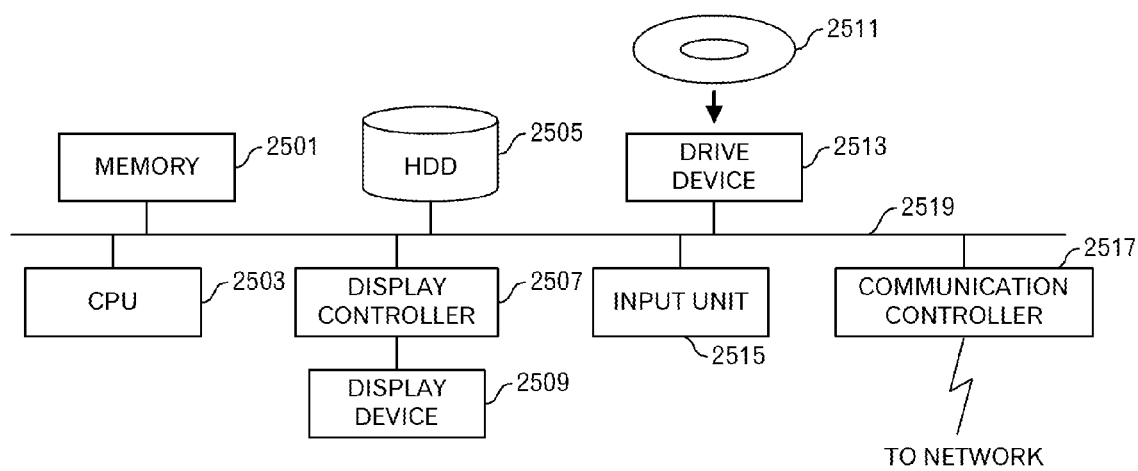
FIG. 15 is a diagram depicting an example of a computer configuration.

In addition, the aforementioned backup apparatus is computer device as illustrated in FIG. 15. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 15. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A backup method relating to the embodiment includes: determining whether or not a previous backup processing was automatically executed (or whether or not an activation type of a previous backup processing is "manual"); and upon determining that the previous backup processing was automatically executed, merging a previous backup data into a current backup data.

Thus, it is possible to suppress increase of an amount of accumulated backup data generated by the automatic backup. Because the automatic backup is carried out mainly in order to preserve the latest data, it is considered that there is no problem even when data that is not used to restore the latest data is deleted by the merging.

In addition, the determining and the merging maybe executed in response to an automatic backup processing.

Thus, the merge is automatically executed with the automatic backup. Therefore, it is possible to suppress the increase of the amount of the accumulated backup data without performing a merge operation by the user. Especially, it is effective that the steady increase of the amount of stored data by repeating the automatic backup is prevented. Moreover, when the user does not mention the increase of the amount of stored data or when the user fails to instruct the merge processing, it is effective that the merge is performed automatically. Especially, there is a case where a beginner does not recognize the effectiveness of the merge processing, and the beginner feels that a selection operation of the backup data to be merged is complicated. Therefore, such a beginner may keep a wide berth of instructing the merge processing. Therefore, according to this configuration, not only the data created or updated by such a beginner is protected but also the increase of the amount of stored data is suppressed.

Moreover, the aforementioned determining may include determining whether the previous backup processing was manually executed, and upon determining that the previous backup processing was manually executed, the merging is not executed.

Thus, it is possible to avoid deletion of the manual backup data by the merging. When the manual backup may be carried out in order to intentionally leave the backup data by the user, it is preferable that it is possible to restore the data when the manual backup is performed.

The aforementioned backup processing may be a differential backup processing.

Generally, when data is restored by using the differential backup data for multiple times, the processing to restore the data becomes complicated. However, when the merge is performed according to the embodiment every time when the automatic differential backup is executed to leave only the latest backup data, it is possible to shorten the processing time to restore the data, because the processing to restore the data becomes simple.

Furthermore, the determining may include determining whether a current backup target is identical to a previous backup target, and upon determining that the current backup target is identical to the previous backup target, the merging is executed.

Thus, it is possible to avoid activating the merge processing for which the merge targets are not identical.

In addition, the determining may include determining whether the previous backup data exists, and upon determining that the previous backup data exists, the merging is executed.

Thus, it is possible to avoid activating the merge processing when there is no merged backup data.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A backup method, comprising:
   determining, by using a computer and in response to an automatic backup processing, whether a previous backup processing was automatically executed or manually executed;
   upon determining that the previous backup processing was automatically executed, merging, by using the computer and in response to the automatic backup processing, a previous backup data into a current backup data; and
   upon determining that the previous backup processing was manually executed, omitting, by using the computer, the merging.

2. The backup method as set forth in claim 1, wherein the previous backup processing is a differential backup processing.

3. The backup method as set forth in claim 1, wherein the determining comprises determining whether a current backup target is identical to a previous backup target, and upon determining that the current backup target is identical to the previous backup target, the merging is executed.

4. The backup method as set forth in claim 1, wherein the determining comprises determining whether the previous backup data exists, and upon determining that the previous backup data exists, the merging is executed.

5. A computer-readable, non-transitory storage medium storing a program for causing a computer to execute a process, the process comprising:
   determining, in response to an automatic backup processing, whether a previous backup processing was automatically executed or manually executed;
   upon determining that the previous backup processing was automatically executed, merging, in response to the automatic backup processing, a previous backup data into a current backup data; and
   upon determining that the previous backup processing was manually executed, omitting the merging.

6. An information processing apparatus, comprising:
   a memory; and
   a processor configured to use the memory and execute a process, the process comprising:
   determining, in response to an automatic backup processing, whether a previous backup processing was automatically executed or manually executed;
   upon determining that the previous backup processing was automatically executed, merging, in response to the automatic backup processing, a previous backup data into a current backup data; and
   upon determining that the previous backup processing was manually executed, omitting the merging.

* * * * *